United States Patent [19]

Tendler

[11] Patent Number: 4,918,671
[45] Date of Patent: Apr. 17, 1990

[54] DEPTH SOUNDER OPERATION FOR HOSTILE ENVIRONMENTS

[76] Inventor: Robert K. Tendler, 19 Lawrence Ave., Chestnut Hill, Mass. 02167

[21] Appl. No.: 333,610

[22] Filed: Apr. 5, 1989

[51] Int. Cl.$^4$ ............................................... G01S 9/66
[52] U.S. Cl. ...................................... 367/87; 367/88; 367/901; 181/124
[58] Field of Search ................. 367/901, 900, 105, 98, 367/87, 88; 181/124, 123

[56] References Cited

U.S. PATENT DOCUMENTS

| | | | |
|---|---|---|---|
| 3,624,596 | 11/1971 | Dickenson | 367/114 |
| 3,787,803 | 1/1974 | Beebe | 367/97 |
| 3,924,258 | 12/1975 | Fowler | 367/108 |
| 4,187,488 | 2/1980 | Anderson et al. | 367/87 |
| 4,410,966 | 10/1983 | Meyer et al. | 367/87 |
| 4,439,844 | 3/1984 | Menin | 367/87 |
| 4,785,429 | 11/1988 | Folwell et al. | 367/98 |

Primary Examiner—Deborah L. Kyle
Assistant Examiner—J. Woodrow Eldred
Attorney, Agent, or Firm—Robert K. Tendler

[57] ABSTRACT

A system is provided for the detection of an unsuitable water condition in which either large globules of solid material or bait fish suspended in the water beneath a vessel adjacent the hull of the vessel are detected and the associated depth sounding device is inhibited from providing a depth output. This eliminates the display or annunciation of erratic depth data, or the use of erratic data for closed or open loop control systems. In one embodiment, the unsuitable water condition is sensed through the detection of returns in a short water column adjacent the hull. In a further embodiment, returns from the water column coupled with receiver gain being open above a predetermined threshold provide the indication of the presence of the unsuitable water condition. The subject system may be used for other unsuitable water conditions that exist at the hull of the vessel and which would cause erratic depth readings, with such unsuitable water conditions including non-laminar flow, oil or sludge, and turbulence or bubbles, all of which result in returns in the water column immediately beneath the hull.

9 Claims, 3 Drawing Sheets

G - ALMOST CLOSED
D - NO INDICATIONS IN WATER COLUMN
⇒ DISPLAY DETECTED DEPTH

G - 1/2 OPEN
D - INDICATIONS IN WATER COLUMN
⇒ INHIBIT

DEPTH SOUNDER OPERATION FOR HOSTILE ENVIRONMENTS

FIELD OF INVENTION

This invention relates to depth sounding devices and more particularly to a system for recognizing and dealing with the problem of unsuitable water conditions which cause erratic depth readings.

BACKGROUND OF THE INVENTION

Depth sounders which project sonic pulses from the hull of a vessel through the water to the bottom and then back again provide an indication of the depth of the water under the vessel. As is the case in all depth sounders, the round trip travel time of the sonic pulses projected into the water is measured, with the round trip travel time providing an indication of depth of reflecting targets, be it the bottom of the body of water or some other target.

As to digital depth sounders, were the water involved to be clear of refuse, mud globules, thermals, or small targets such as bait fish, bubbles, non-laminar flow or turbulence produced around the hull, the digital depth reading would be stable. However, this is not the case. What in fact occurs is that the above conditions cause the digital depth sounder either to read the shallowest depth for which the depth sounder is designed, or to cause the depth indication to flip around, sometimes in a mindless fashion, with the returns seeming to come from both shallower depths than the bottom, as well as much deeper depths as the depth sounder attempts to lock onto the bottom in a relock cycle.

In short, depth sounders give erratic readings when the water quality is degraded by non-miscible materials such as refuse, mud or physical objects in the water, is replete with small fish in layers beneath the vessel, is inundated with oil or sludge which reduces transducer efficiency, or is disturbed by bubbles or turbulence. These conditions are grouped together and referred to herein as "dirty" water. Since the depth sounder usually reads its shallowest possible depth in these circumstances, this is not only annoying; but, in some cases, safety is compromised.

The problem is not dissimilar to close in clutter in radar systems in which time varying gain, properly adjusted, adjusts the gain of the receiver to such a low level that near in clutter is not detected by the receiver. The time varying gain of a system involves the gain adjustment from zero along a $T^3$ or $T^4$ curve in that the receiver gain is opened in a non-linear fashion from the beginning of the transmitted pulse.

While time-varying gain circuits are available to eliminate the effect of certain dirty water conditions, they are ineffective especially in Boston Harbor and in newly dredged channels because the amount of particulate matter in the water prevents the lock up of depth sounders to the bottom due to the density of the churned up material or because oil or sludge coats the face of the transducer which drastically reduces its response. Dirty water is most evident after storms or in newly dredged channels, or indeed where actual refuse or oil is dumped into the body of water. The relock process for most depth sounders can be confused to such an extent by the small dispersed targets that the microprocessor-driven algorithms cannot provide appropriate lock to the bottom. Erratic or low readings are also caused by opening the gain of the receiver all the way in the presence of such dirty water. The net result is that the physical phenomenon of dirty or unsuitable water prevents accurate readings from being taken, with the depth sounder locking up to its shallowest depth.

SUMMARY OF THE INVENTION

While it is not possible to alter the physical arena in which the depth sounding takes place, in the present invention a dirty or unsuitable water condition, especially immediately beneath the vessel, is sensed and the depth sounder indication inhibited or in some manner changed to indicate that dirty water is present. This prevents providing false readings or spurious readings, while at the same time giving the operator of a vessel an indication of the type of water condition in the vicinity of his vessel. If, rather than being a visual display of depth, the depth is annunciated, then the annunciation can be inhibited for such time as the unsuitable water condition exists.

Moreover, when an unsuitable water condition is indicated for instance by the presence of bait fish adjacent the hull of a vessel, for those systems which utilize a depth sounder to drive an automatic downrigger, the drive for the automatic downrigger can be inhibited upon the detected presence of bait fish or other near-in unsuitable water. This is important because should the downrigger ball be at, for instance, 130 feet below the vessel, and should bait fish exist in a water column between three and four feet beneath the vessel, and should this condition be detected, then the downrigger is prohibited from driving the downrigger ball from 130 feet up to four feet, which is where the returns would be coming from off the school of bait fish. It will be appreciated that bait fish can present such a target to the depth sounder that it is a virtually impenetrable blanket in a given area. This occurs very often around oil rigs and would ordinarily result in the unnecessary driving of the downrigger ball from the depth where it is normally located up to the surface.

How to detect the dirty water condition is now discussed. In one embodiment this is accomplished merely by measuring returns from the bottom of the boat to a given depth such as four feet; and, if there are any returns in this four foot segment, the depth sounder output is inhibited. This of course would limit the shallow range of the depth finder to four feet. However, it is possible to bring the depth range to its nominal shallow water range by sensing returns in a water column, for instance, between the shallowest range for the depth sounder and four feet. Ordinarily, in the absence of dirty water, one would like to be able to recognize the presence of returns at this shallowest range and not inhibit the display. This is accomplished in one embodiment by recognizing that the gain of the receiver will be barely open at the shallowest range. If the gain of the receiver is, for instance, less than ½ the total gain, this would indicate that the vessel is in shallow water; and, if there are returns as from a bottom at, for instance, three feet, these returns would be displayed or annunciated because the receiver gain would not reach the ½ open inhibit threshold, or any suitable threshold set. On the other hand, if the boat were in twenty feet of water, the receiver gain for detecting the bottom would ordinarily be open by more than ½. If returns existed between the shallowest level and four feet and the gain was greater than ½, this would be a condition which would cause the inhibition of the depth sounder output.

Thus, in one embodiment, inhibiting the depth sounder output is coupled to the gain step or gain of the receiver. The purpose of this is to provide for adequate shallow water performance while at the same time being able to detect an unsuitable water condition.

In one embodiment, the water column is set such that returns between three feet and four feet inhibit depth sounder output upon the presence of return signals between three and four feet, with a receiver gain step greater than 7, and with 14 total gain steps.

What is accomplished therefore is the sensing of a dirty or other unsuitable water condition which would ordinarily cause false readings from the depth sounder. While the subject system does not employ techniques for limiting the size of targets to which the depth sounder will respond, it does increase the apparent stability of the depth sounder by preventing the intermittent flipping of the digital display or by preventing annunciation of erroneous depths.

In summary, a system is provided for the detection of an unsuitable water condition in which either large globules of solid material or bait fish suspended in the water beneath a vessel adjacent the hull of the vessel are detected and the associated depth sounding device is inhibited from providing a depth output. This eliminates the display or annunciation of erratic depth data, or the use of erratic data for closed or open loop control systems. In one embodiment, unsuitable water conditions are sensed through the detection of returns in a short water column adjacent the hull, with the length of the water column being only a fraction of the useable range of the depth sounder. It has been found that dirty water, if it exists, will almost always exist adjacent the hull of the vessel. This permits detection of the overall condition by detecting returns from water near the hull.

In a further embodiment, returns from the water column coupled with receiver gain being open above a predetermined threshold provide the indication of the presence of the dirty or unsuitable water condition. The subject system may be used for any unsuitable water condition that exists at the hull of the vessel and which would cause erratic depth readings, with such unsuitable water conditions including non-laminar flow, oil or sludge, turbulence or bubbles, all of which result in apparent returns in the water column immediately beneath the hull.

It is therefore an object of this invention to provide a method and apparatus for sensing a dirty water condition by sensing returns from water immediately adjacent the hull of a vessel.

It is another object of this invention to provide a system for either inhibiting a depth sounder output or indicating unsuitable water, when such unsuitable water exists immediately beneath bottom of the vessel involved.

It is a still further object of this invention to provide a filtering system for depth sounding devices in which the shallow water performance of the device is not altered by virtue of the system for detecting an unsuitable water condition.

As part of the subject invention, it will be appreciated that the detection of any unusual perturbation in the water immediately below the hull of the vessel can give rise to erroneous readings of depth. Sensing these abnormalities and inhibiting the output of the depth sounder until the transient condition passes is therefore part of the subject invention.

BRIEF DESCRIPTION OF THE DRAWINGS

These and other objects of the invention will be better understood taken in conjunction with the Detailed Description in conjunction with the Drawings of which.

DETAILED DESCRIPTION

Figure 1:
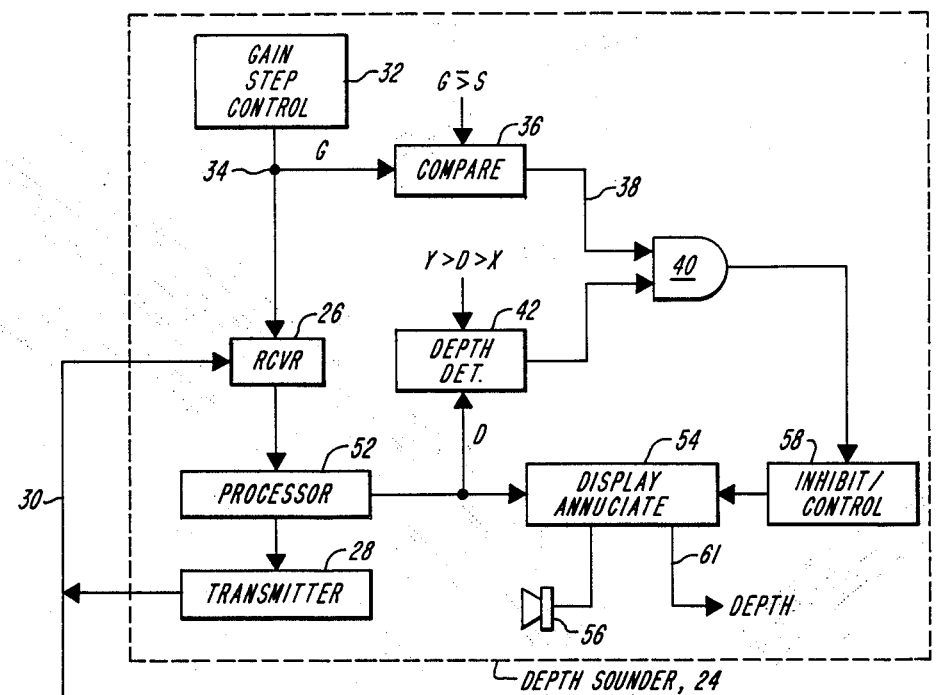
FIG. 1 is a diagrammatic and schematic representation of a dirty and thus unsuitable water condition, the sensing of the unsuitable water condition in a water column beneath the transducer, and a system for inhibiting the display or annunciation of depth responsive to the detection of the unsuitable water condition.
Figure 1:
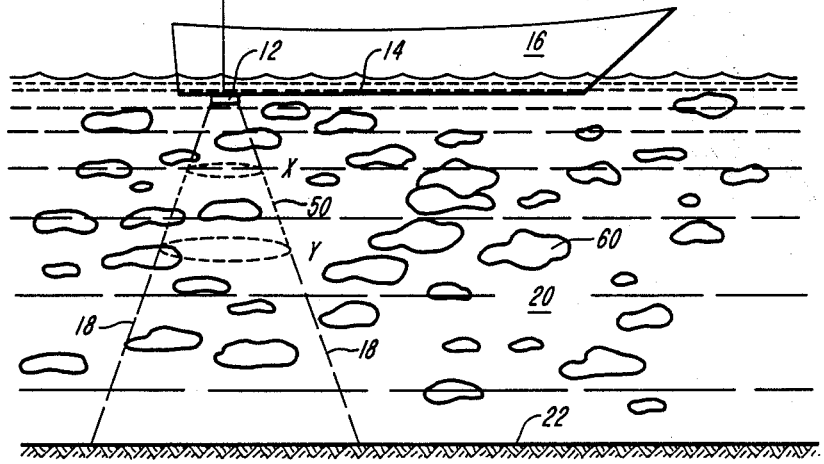

Referring now to FIG. 1, a vessel 10 includes a transducer 12 at the bottom 14 of the hull 16 of the vessel. This transducer projects a cone of radiated energy illustrated by cone 18 into the water 20 beneath the vessel such that pulses are projected via transducer 12 and impinge upon the bottom 22 of the body of water in which vessel 10 is located. Returns from the bottom are detected by transducer 12 and are transmitted to a conventional depth sounder 24 which includes a conventional receiver 26 that detects the return pulses. The original pulses are generated by a transmitter 28 and are coupled along transmission line 32 to transducer 12. Receiver 26 is controlled in its gain by a gain step control unit 32, with the receiver, in one embodiment, having fourteen gain steps. The gain step to which the receiver is set is available over line 34 and is provided to a comparitor 36 which compares the gain step to a pre-determined gain threshold S. When the gain of the receiver is greater than or equal to S, a pulse is provided over line 38 to an AND gate 40 which has as its other input a detector 42 output, which corresponds to a detected depth being greater than a distance X below the transducer and less than a distance Y. This corresponds to a near-in water column illustrated in dotted outline by reference character 50. It will be noted that while X could be made to be equal to zero, in most instances, depth sounders have a "blind" which blanks out the receiver so receiver 26 does not respond to the transmitted pulse or any related unsettled conditions. In most cases, this blind is between two and three feet such that the receiver 26 is blinded for that period of time. Thus, the earliest possibility of detecting a return pulse would be, for instance, when X equals 3. In one embodiment, Y is equal to 4 which gives enough of a water column adjacent to the hull to detect dirty water or any other unsuitable water condition.

It will be appreciated that receiver 26 detects sonar pulses after the blanking is removed and couples the returned pulse to a processing unit 52 which provides not only for the control of transmitter 28; but, also provides for the calculation of depth and the coupling of a digital indication of depth to display/annunciate unit 54. This unit may be a conventional digital display, or, can be a unit which converts the digital number into an audible call out of depth over a speaker 56.

In any event, when the gain of the receiver G is greater than or equal to S; and D, the detected depth, is detected as being between X and Y feet, the output from AND gate 40 coupled to an inhibit/control circuit 58 causes the display or annunciation at unit 54 to be inhibited. Also, the transmission of a depth related signal over line 61 may be inhibited, which depth signal may be utilized, for instance, to control a downrigger.

It will be seen that, for dirty water, there are dispersed targets 60 which are of sufficient density and distribution to exist within water column 50 and to be detected by virtue of returned acoustic energy to transducer 12. What this means is that despite the fact that the bottom is, for instance, at 22 feet below the vessel, sufficient dispersed particulate matter of sufficient size to qualify as a target exists within water column 50, which condition is sensed by receiver 26 and is indicated by the detected depth output of processor 52 being between three and four feet. The output of the processor is coupled to detector 42 which compares the output to ascertain if the reading from the processor 52 is within the three to four foot range, at which point, a signal is applied to one input of AND gate 40. Should there be a signal applied to other input of AND gate 40 from comparitor circuit 36 indicating that the gain of the receiver is greater than a Predetermined threshold, then inhibiting takes place. Because of the gain dependency, the lower limit of water column 50 can be extended to deeper depths without affecting shallow water response. Thus, water column 50 can be made to be more than one foot in length, with the length depending on where the gain threshold is set.

If it is not important to maintain the shallow water effectiveness of the depth sounder, the gain condition described above may be eliminated such that at any gain, upon detection of dirty water within the water column, an inhibit signal will be applied. For this case and referring to FIG. 1, the minimum depth indicatable by the depth sounder for display would be four feet. Should there be dirty water between three and four feet in water column 50, this would inhibit the display/annunciation unit 54, at least for the time that dirty water exists within water column 50. However, should one wish to obtain the minimum depth possible from the depth sounder, then the above-described gain-dependent system is useful in deciphering when the return in the three to four foot region reflects actual bottom or when it reflects a dirty or unsuitable water condition.

Figure 2:
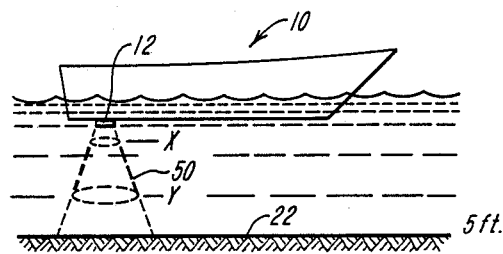
FIG. 2 is a diagrammatic illustration of a clear water condition at relatively shallow depth indicating no returns in the water column of FIG. 1.

In operation, and referring to FIG. 2, a clear water condition is indicated for a depth of the bottom of, for instance, five feet. Here, the gain of the aforementioned receiver is almost closed. Moreover, there are no returns from water column 50. Thus, the displayed depth would be the actual detected depth. Were the actual depth to decrease to three feet, this would also be indicated because the gain of the receiver would be almost closed. Should the depth be twenty feet for the clear water situation depicted in FIG. 2, the indication would be the actual twenty foot true depth.

Figure 3:
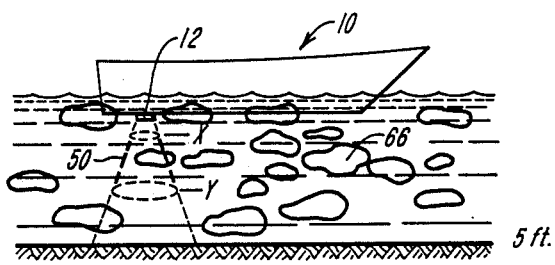
FIG. 3 is a diagrammatic illustration of the FIG. 2 embodiment in which an unsuitable water condition occurs at a relatively shallow depth, indicating that due to the unsuitable water condition, the gain of the receiver is likely to be more than one-half open, with inhibiting of the display and annunciation of depth occurring in this illustrated case.

Referring to FIG. 3, in the situation illustrated in FIG. 2, but with a dirty water situation as illustrated by particulate matter 60 existing in water column 50, the receiver, due to the density of the particulate matter, will be open beyond the threshold S. This coupled with returns from the water column results in inhibiting the depth sounder output.

Figure 4:
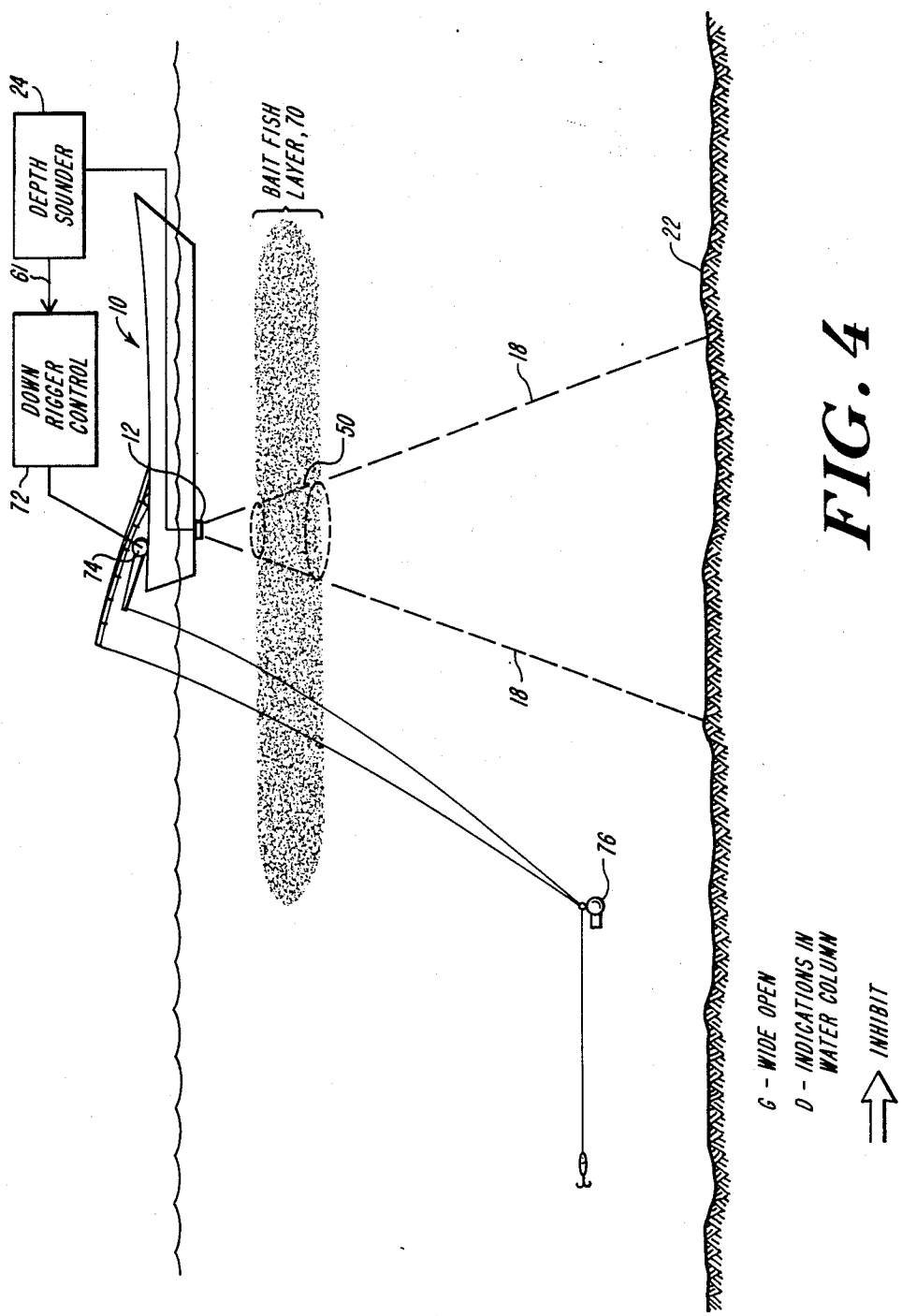
FIG. 4 is a diagrammatic illustration of the presence of bait fish in the aforementioned water column, in which the gain of the receiver is wide open at relatively deep depths, and in which the bait fish layer, which periodically occurs, causes inhibition of the depth sounder output when such a bait fish layer is detected.

Referring to FIG. 4, a bait fish layer situation is illustrated. Here, vessel 10 is in water potentially as great as 150 feet, with the bottom 22 being 150 feet below the bottom of vessel 10. In this case, a bait fish layer 70 exists within water column 50 which would ordinarily result in depth sounder 24 providing an indication of a depth of three feet to a downrigger control circuit 72. Such a situation would cause the actuation of the downrigger motor 74 to regulate the depth of a downrigger ball 76 to the surface.

However, with the subject system, it will be appreciated that the depth signal over line 61 will be inhibited because the normal gain of the receiver will be wide open for the relatively deep depth in which vessel 10 is operating. Bait fish will cause returns in water column 50. This being the case, signals being applied to line 61 to control the downrigger control unit 72 will be inhibited. For the rare times in which the bait fish layer become obtrusive, the downrigger control will not be affected.

As to oil covering the transducer, the subject system also responds to this condition to inhibit depth sounder output. In this case, the receiver gain will be wide open due to the inefficiency of the coated transducer. The depth sounder will then detect apparent returns at its shallowest depth capability. This is due either to actual returns or virtual returns due to ringing of the transducer and receiver circuits at wide open again. Regardless of the cause of the shallow depth detection, without the subject circuit, the depth sounder would output its shallowest depth reading. With the subject technique, such an output is inhibited.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. In a depth sounding system adapted to be used on a vessel which includes a depth sounder for indicating the depth of water under said vessel and a transducer coupled thereto, with the transducer projecting a pulsed beam of energy into the water beneath said vessel, a system for eliminating false depth sounder readings caused by an unsuitable water condition characterized by targets within a predetermined distance down from the bottom of the vessel comprising:

means coupled to said transducer for sensing returns from targets within a water column that extends a predetermined depth below said vessel in the beam of said transducer; and, means for inhibiting all current dpeth indicating outputs of said depth sounder responsive to said sensed returns, whereby false indications of depth due to an unsuitable water condition are eliminated from being indicated upon the detection of said unsuitable water condition.

2. The system of claim 1 wherein said sensing means further includes means for defining the length and position of said column to exist from a first predetermined depth beneath the said transducer to a second predetermined depth.

3. The system of claim 2 wherein said water column has a length of one foot, whereby an unsuitable water condition within the one foot water column inhibits depth sounder output.

4. The system of claim 1 and further including a gain stepped receiver within said depth sounder, means for controlling the gain step of said receiver, and means for inhibiting the output of said depth sounder only upon the detection of returns within said column and then only if the gain step of said receiver is above a predetermined gain step.

5. The system of claim 1 and further including a gain-controlled receiver, means for establishing the gain of said receiver, and means for inhibiting the output of said depth sounder only upon detection of returns within said column and then only if the gain of said receiver is above a predetermined threshold.

6. The system of claim 1 wherein said depth sounder has a minimum depth which can be indicated and wherein said predetermined depth at which unsuitable water is detected is shallower than said minimum depth.

7. The system of claim 1 wherein said predetermined depth is greater than the shallowest depth indicated by said depth sounder by a predetermined amount.

8. The system of claim 7 wherein said predetermined amount is a small fraction of the total range of said depth sounder, whereby unsuitable water near the bottom of said vessel is indicative of an overall unsuitable condition which could result in false depth sounder indications.

9. In a depth sounding system adapted to be used on a vessel which includes a depth sounder and a transducer coupled thereto, with the transducer projecting a pulsed beam of energy into the water beneath said vessel, a system for indicating an unsuitable water condition in the water beneath the vessel, said unsuitable water condition characterized by targets within a predetermined distance down from the bottom of the vessel which condition can affect the operation of said depth sounder, comprising:

means for sensing returns from targets within a water column that extends within a predetermined depth below said vessel in the beam of said transducer, said predetermined depth being a fraction of the total depth range of said depth sounder; and, means for inhibiting all current depth indicating outputs of said depth sounder for sensed returns in said fraction of total depth.

* * * * *